United States Patent [19]

Siegenthaler

[11] Patent Number: 5,206,031

[45] Date of Patent: Apr. 27, 1993

[54] VEHICLE TIRE LOADING-UNLOADING DEVICE

[75] Inventor: Karl J. Siegenthaler, Rome, Italy

[73] Assignee: Bridgestone/Firestone, Inc., Akron, Ohio

[21] Appl. No.: 725,158

[22] Filed: Jul. 3, 1991

[30] Foreign Application Priority Data

Jul. 27, 1990 [IT] Italy .................. 67592-A/90

[51] Int. Cl.$^5$ ............................. B29C 35/02
[52] U.S. Cl. ..................... 425/38; 425/58.1
[58] Field of Search .............. 425/38, 58.1, 28.1

[56] References Cited

U.S. PATENT DOCUMENTS

| 1,895,909 | 1/1933 | Blaker ................................. 425/38 |
| 2,066,265 | 12/1936 | Freeman . |
| 3,008,180 | 11/1961 | Woodall . |
| 3,075,237 | 1/1963 | Soderquist . |
| 3,170,187 | 2/1965 | Brundage . |
| 3,483,596 | 12/1969 | Ulm ..................................... 414/749 |
| 3,645,660 | 2/1972 | Hugger et al. ...................... 425/445 |
| 3,667,881 | 6/1972 | Cimprich ........................... 425/28.1 |
| 3,692,444 | 9/1972 | Hugger et al. ..................... 425/28.1 |
| 3,712,769 | 1/1973 | Cimprich ............................. 425/38 |
| 4,092,090 | 5/1978 | Yuhas et al. ........................ 425/445 |
| 4,447,385 | 5/1984 | Blosser et al. ....................... 425/38 |
| 4,702,669 | 10/1987 | Ichikawa et al. . |

FOREIGN PATENT DOCUMENTS

| 0154612 | 9/1985 | European Pat. Off. ............ 264/326 |
| 2370574 | 6/1978 | France ................................ 264/326 |
| 1381700 | 1/1975 | United Kingdom ................. 425/38 |

Primary Examiner—Willard Hoag
Attorney, Agent, or Firm—Ernst H. Ruf

[57] ABSTRACT

A vehicle tire loading-unloading device having a mobile loading-unloading unit designed to enter inside a tire curing unit for receiving a cured tire on an upper supporting unit and, at the same time, releasing into the curing unit a green tire loaded on a suspension unit located beneath and integral with the upper supporting unit; the mobile loading-unloading unit being rotatable for unloading the cured tire.

6 Claims, 3 Drawing Sheets

VEHICLE TIRE LOADING-UNLOADING DEVICE

TECHNICAL FIELD

The present invention relates to a vehicle tire loading-unloading device.

BACKGROUND OF THE ART

In particular, the present invention relates to a loading-unloading device for a tire processing machine, and which may be employed to advantage for loading/unloading tires on/off a tire curing unit comprising an upper half mold, a lower half mold and a device for parting the two half molds at the end of each curing cycle; and wherein the two half molds are so formed that, when parted, the cured tire remains integral with the upper half mold.

SUMMARY OF THE INVENTION

The principal aim of the present invention is to provide a loading-unloading device designed to minimize the downtime involved on a tire manufacturing system, particularly a tire curing unit of the aforementioned type, for loading and unloading the unprocessed or green and processed or cured tires, respectively.

With this aim in view, according to the present invention, there is provided a device for loading-unloading vehicle, in particular motor vehicle, tires, characterized by the fact that it comprises a mobile tire loading-unloading unit in turn including an upper unit having plate means for supporting a first tire, and a lower unit having means whereby to retain a second tire; fixed supporting means for said mobile loading-unloading unit; and activating means for moving said mobile loading-unloading unit through a processing unit and between a loading station, wherein said second tire is loaded, and an unloading station, wherein said first tire is unloaded

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
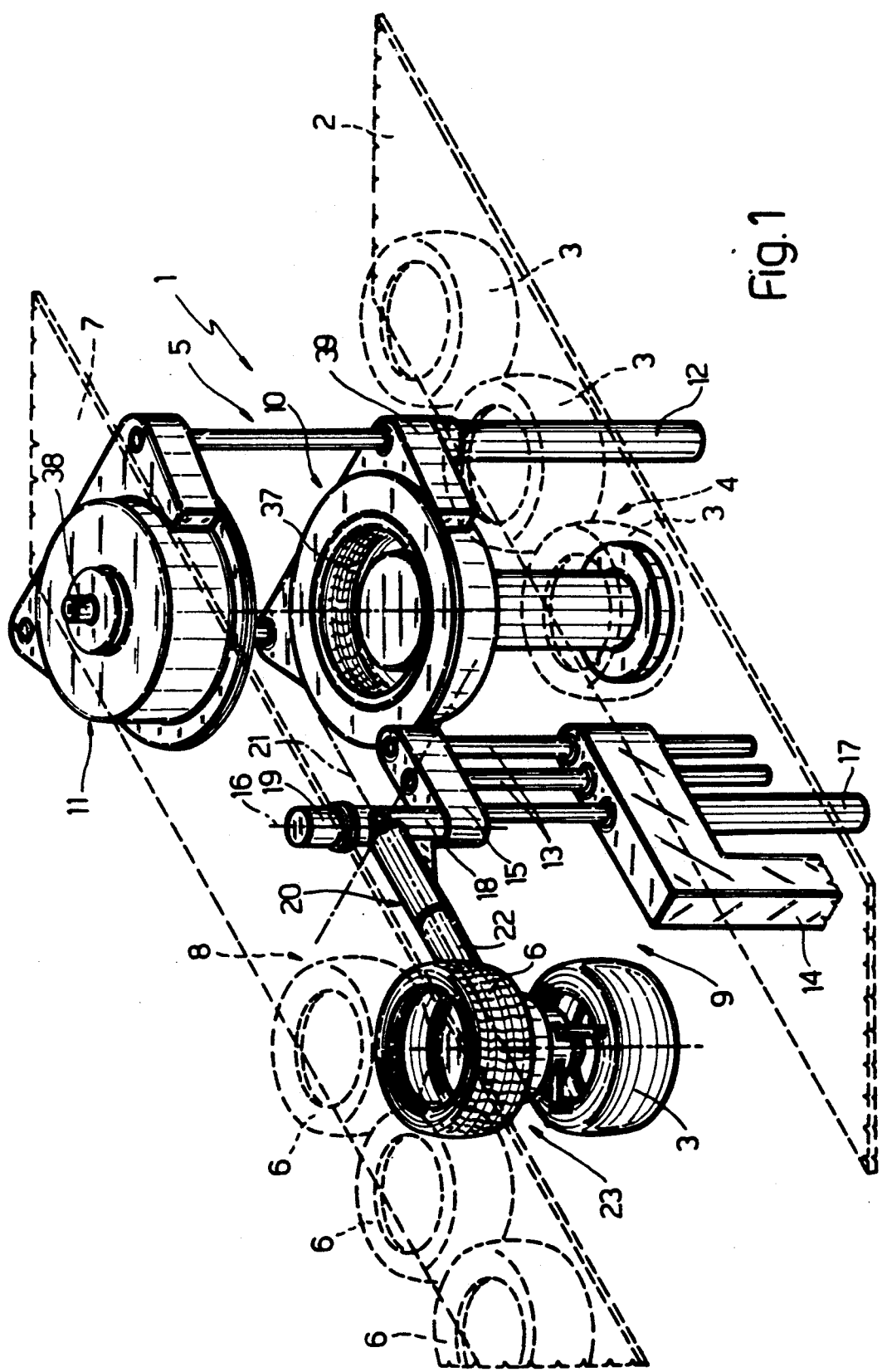
FIG. 1 shows a schematic view in perspective of a system comprising a preferred embodiment of the device according to the present invention.

Number 1 in FIG. 1 indicates a tire curing system including a conveyor 2 for successively feeding green tires 3 to a loading station 4; a curing unit 5 for receiving tires 3 and producing cured tires 6; a conveyor 7 for transferring tires 6 from an unloading station 8; and a device 9 for transferring both tires 3 from loading station 4 to curing unit 5, and tires 6 from curing unit 5 to unloading station 8.

Curing unit 5 is of known type as described, for example, in U.S. Pat. No. 4,747,765, the content of which is fully incorporated herein by reference. Unit 5 includes a lower portion 10 and an upper portion 11 designed to move in relation to each other, by virtue of hydraulic lifting devices 12, between a closed curing position (not shown) and an open position (FIG. 1) for unloading tire 6 and loading tire 3.

Device 9 includes two guide columns 13 extending upwardly from a fixed base 14 and connected by an upper crosspiece 15 designed to move parallel to a vertical axis 16 in relation to base 14 by virtue of a hydraulic actuator 17. Crosspiece 15 is connected to a coupling 18 coaxial with axis 16 and connected to an actuator 19 so as to turn in relation to crosspiece 15 about axis 16. From coupling 18, there extends radially outwardly an arm 20 having an axis 21 perpendicular to axis 16, and comprising a first fixed portion integral with coupling 18, and a second portion 22 designed to turn in relation to coupling 18 about axis 21 by virtue of an angular actuator (not shown) housed inside the fixed portion of arm 20. Device 9 also includes a mobile loading and unloading unit 23 connected integrally with the free end of portion 22 of arm 20.

Figure 2:
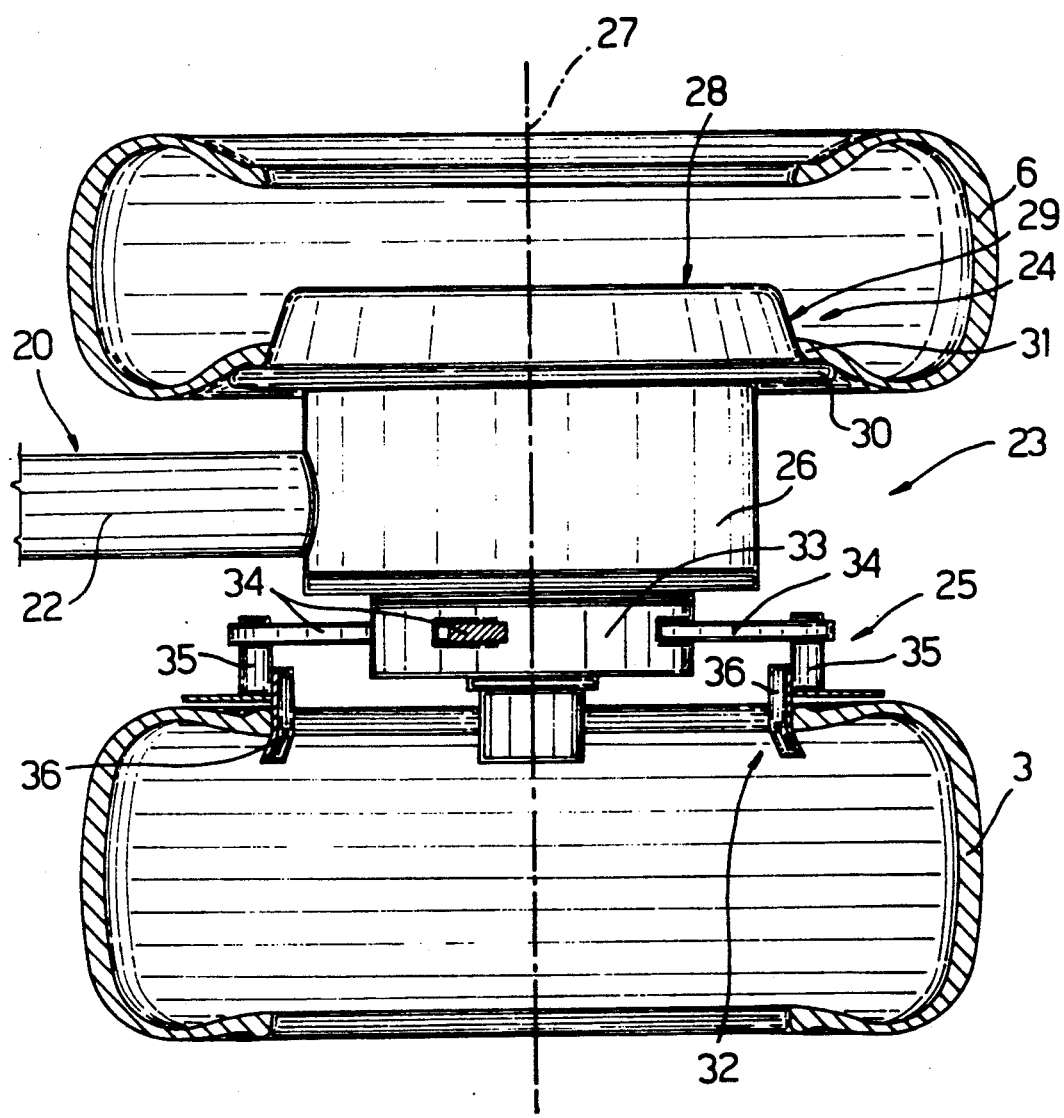
FIG. 2 shows an axial section of a detail in FIG. 1.

As shown in FIG. 2, unit 23 includes an upper unit 24 for supporting tire 6, and a lower unit 25 for suspending tire 3 coaxially with tire 6. Unit 24 comprises a cylindrical body 26 integral with the free end of portion 22 of arm 20 and having a vertical axis 27. The top end of body 26 is fitted with a plate 28 defined externally by an upwardly-tapering, substantially truncated-cone surface 29 coaxial with axis 27. The bottom end of plate 28 presents an outer flange 30 defining a support for the bead portion 31 of tire 6.

Unit 25 is connected integrally with the bottom end of body 26, and comprises a known device 32 for gripping tire 3. Device 32 comprises, in a known manner, a central actuator 33 integral with the bottom end of body 26 and having a number of output rods 34 moving substantially radially between a withdrawn position (not shown) and an expanded position (as shown in FIG. 2). Each rod 34 is fitted on its free end with a pin 35 parallel to axis 27 and fitted on its bottom end with a substantially T-shaped bracket 36 designed to support and grip the bead portion of tire 3 and suspend or position tire 3 beneath body 26.

Operation of system 1 will now be described commencing from the startup stage wherein tire curing unit 5 and transfer device 9 are empty, and a green tire 3 is fed by conveyor 2 to loading station 4. At this point, actuator 19 is operated for positioning unit 23 over tire 3 in loading station 4; and actuator 17 is operated for lowering unit 23, thus gripping tire 3 via gripping device 32, and raising unit 23 with tire 3 suspended on unit 25. Actuator 19 is then operated once more for moving arm 20 toward curing unit 5 and positioning unit 23 between upper and lower curing unit portions 11 and 10 already opened by hydraulic devices 12.

Once unit 2 is coaxial with portions 10 and 11 of curing unit 5, gripping device 32 is operated so as to withdraw rods 34 and deposit tire 3 inside lower half mold 37 on lower portion 10 of unit 5. Unit 23 is then withdrawn from unit 5, which is closed for curing tire 3 and producing cured tire 6. During the curing process, unit 23 is moved into station 4 for picking up another green tire 3 prior to later transferring it to unit 5.

Upon completion of the curing process, curing unit portions 10 and 11 are parted by devices 12, which results, in a known manner, in tire 6 being detached from lower portion 10 and remaining attached to upper portion 11. Unit 23 is then inserted once more between portions 10 and 11, so that unit 24 is located beneath tire 6 attached to portion 11, and unit 25, to which the next tire 3 to be cured is positioned, is located over lower half mold 37. At this point, tire 6 is detached from portion 11 by a known extraction device 38 and deposited onto plate 28 with its bead portion 31 substantially resting on flange 30, and the next tire 3 is deposited onto half mold 37 by withdrawing rods 34 on device 32.

By means of actuators 19 and 17, unit 23 is then withdrawn from curing unit 5; moved over to unloading station 8; turned over, by rotating portion 22 of arm 20, so as to unload tire 6 onto conveyor 7; restored to the normal position with unit 24 being upwardly directed and, finally, returned to loading station 4 to pick up the next green tire 3 via device 32 and await the next unit 5 unloading-loading cycle.

Figure 3:
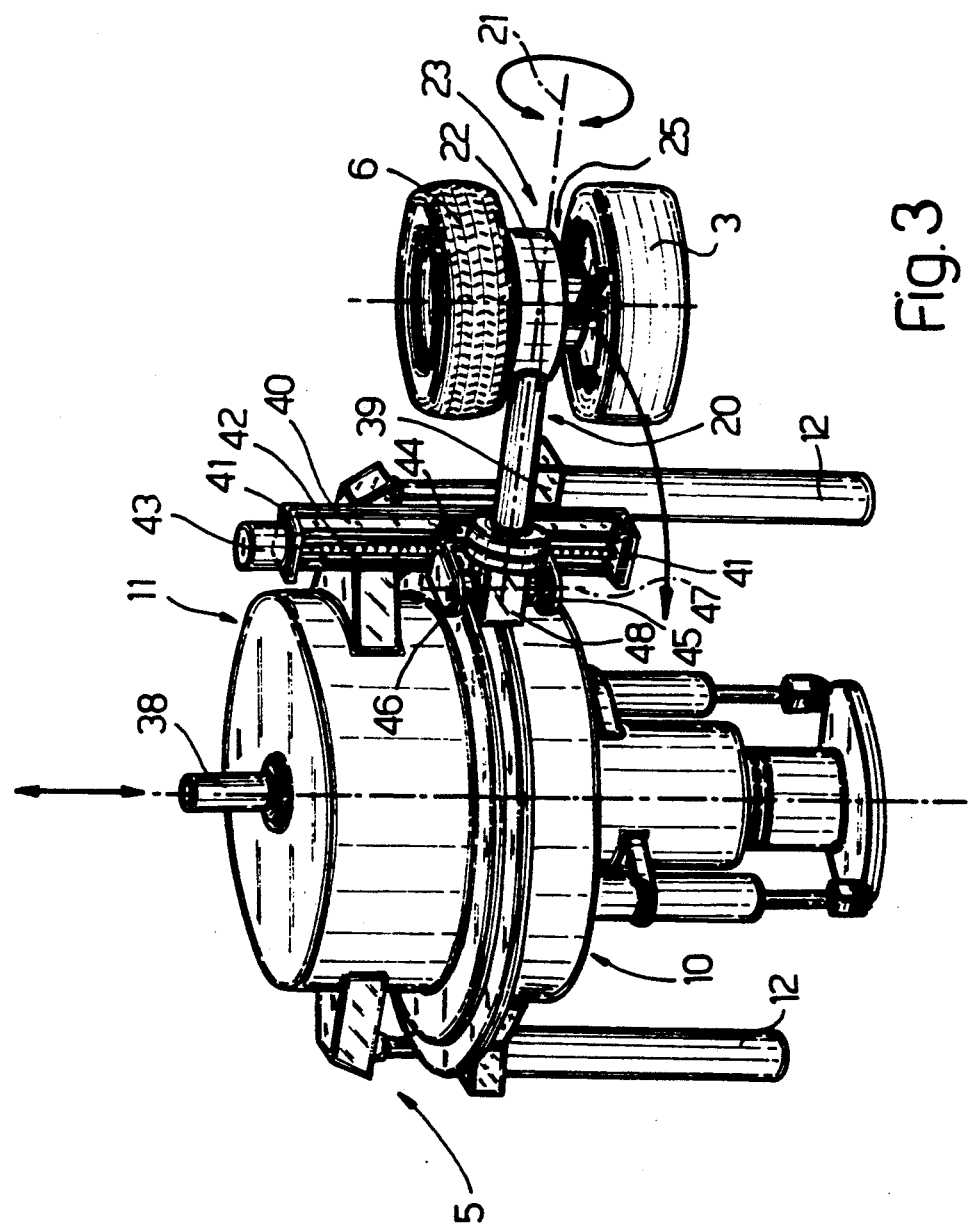
FIG. 3 shows a schematic view of a variation of a detail in FIG. 1, with parts removed for simplicity.

According to the variation shown in FIG. 3, instead of being supported independently, arm 20 is supported directly on curing unit 5. For this purpose, a vertical guide 40, having the same function as columns 13 in FIG. 1, is connected to an apron 39 fitted to lower portion 10 of unit 5 for connecting lifting devices 12. Guide 40 is defined, at its opposite ends, by two transverse plates 41 between which a rotatable screw 42 is mounted which, together with its drive motor 43, constitutes an actuator, similar to 17 in FIG. 1, for moving along guide 40 a slide 44 similar to crosspiece 15 and connected in sliding manner to guide 40. Slide 44 is connected integrally with a fork 45 supporting a rotary pin 46 extending along an axis 47, corresponding with axis 26 in FIG. 1, and powered (in a manner not shown) so as to turn about axis 47. Pin 46 is connected integrally with the outer casing of an angular actuator 48 constituting a first portion of arm 20, the second portion 22 of which is connected to loading-unloading unit 23, extending along axis 21, and is designed to turn about axis 21 by virtue of actuator 48.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A device for loading-unloading vehicle tires comprising a mobile loading-unloading unit having an upper unit with plate means for supporting a first tire, and a lower unit having means for carrying a second tire; fixed supporting means for supporting said mobile loading-unloading unit; and activating means for moving said mobile loading-unloading unit through a processing unit and between a loading station, wherein said second tire is loaded, and an unloading station, wherein said first tire is unloaded.

2. A device as claimed in claim 1 in which said upper and lower units are coaxial.

3. A device as claimed in 2 in which said activating means include guide means extending from said supporting means along a first axis; in which slide means is mounted in a sliding manner along said guide means; and in which an arm extends along a second axis, and is supported on said slide means so as to turn in relation to said slide means about said first axis, and is connected to said mobile loading-unloading unit.

4. A device as claimed in claim 3 including rotation means for turning said mobile loading-unloading unit about said second axis.

5. A device as claimed in claim 4 in which said supporting means consists of said processing unit.

6. A device as claimed in claim 3 in which said processing unit is a curing unit and includes an upper portion, a lower portion, and means for parting said two portions at the end of each curing cycle; in which said two portions are so formed that, when parted in use, the cured tire remains integral with said upper portion; and in which said cured tire comprises said first tire, and said second tire being a green tire.

* * * * *